W. T. BARNES.
CENTRIFUGAL PUMP.
No. 728.
Reissued May 24, 1859.
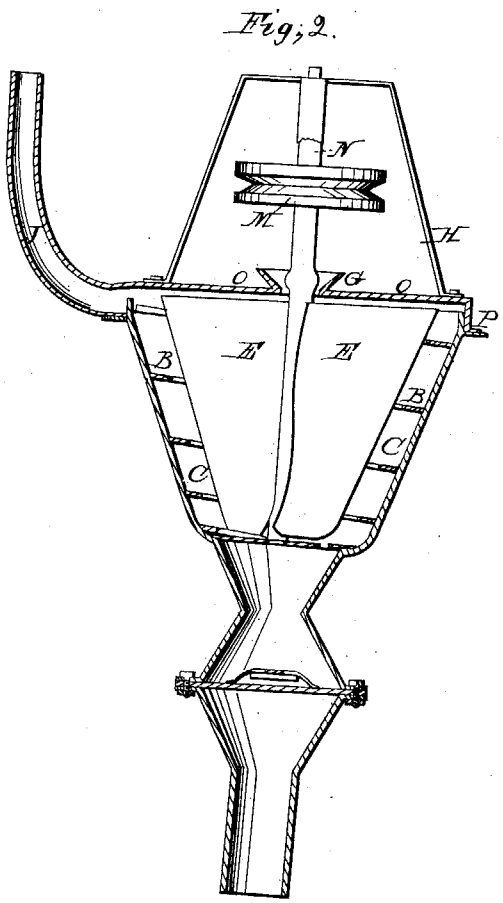
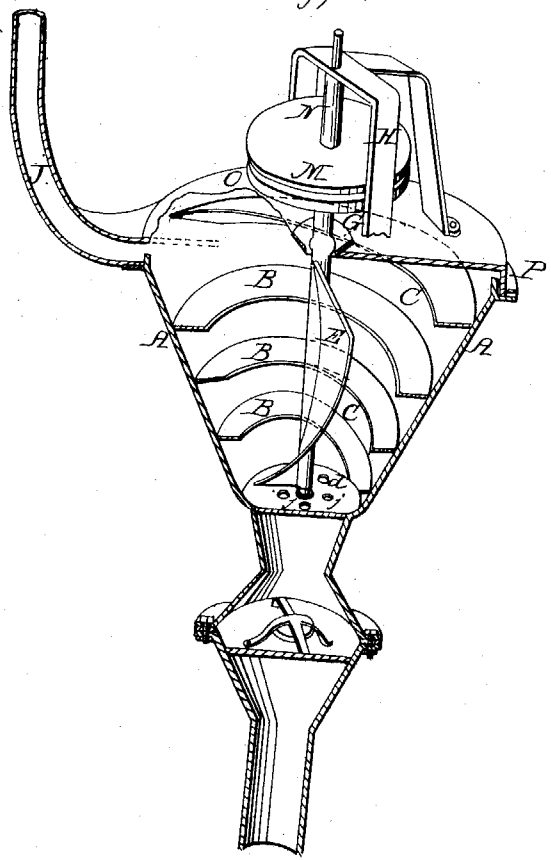
Witnesses;
M. B. Radcliff
F. L. Smith
Inventor;
William T. Barnes
THE NORRIS PETERS CO., PHOTO-LITHO., WASHINGTON, D. C.

UNITED STATES PATENT OFFICE.

WILLIAM T. BARNES, OF BUFFALO, NEW YORK.

IMPROVEMENT IN APPARATUS FOR RAISING WATER.

Specification forming part of Letters Patent No. 6,191, dated March 20, 1849; Reissue No. 728, dated May 24, 1859.

*To all whom it may concern:*

Be it known that I, WILLIAM T. BARNES, of Buffalo, Erie county, in the State of New York, have invented certain new and useful Improvements in Apparatus for Raising Water, of which the following is a full, clear, and exact description of the construction and operation of the same, reference being had to the accompanying drawings, forming part of this specification, in which—

Figure 1 represents a perspective view of my improved apparatus with the side of the casing removed in order to show the interior. Fig. 2 represents a sectional elevation of the same.

In the drawings, A is a metallic casing in the form of a frustum of a cone, the sides of which slope outward from the lower or small end, forming an inclined plane.

B is a thin projecting flange or rib winding spirally around the interior of the casing like a screw, the pitch or inclination to the axis of the cone increasing from the small to the large end, and forming a spiral ascending and enlarging channel for the water.

N, a shaft or piston-rod running through the center of the casing, has its lower bearing in a step, *d*.

E are blades or arms attached to the rod N and form the piston. These blades are inclined to the axis of the rod, and their outer edges fitted to run close to the projecting rib.

G is a sloping recess in the cap O to secure the packing around the piston-rod and prevent the escape of water or the admission of air into the casing.

H are brackets bolted to the cap, which give support to the upper end of the piston-rod.

I is the discharge-spout through which the water is forced.

J are induction-openings in the bottom of the casing through which the water enters.

K is suction-pipe attached to the small end of the casing, with an enlarged chamber for a valve, D, which retains the water in the casing. This pipe is made in two parts, with the joint above the valve-seat, so that the lower part may be removed to repair the valve or remove obstructions from the valve-chamber.

M is a band-wheel by which motion is communicated to the piston.

P is a projecting flange on the exterior and around the upper edge of the casing, and forms the seat to which the cap O may be bolted, and this joint may be packed, if necessary, in order to make it water-tight.

The different parts of the apparatus may be made of wood and iron, or any other materials in whole or in part, and of any size or proportions to adapt it to different situations or circumstances in which it is used.

The slope of the side of the casing may be varied and the casing constructed with or without the spiral rib on the interior.

The piston rod and blade may be made separate and bolted together, or made in one piece, and the blades may incline at greater or less angle to the axis of the piston and a greater or less number may be attached to the rod. The blades in all case must be made to accurately fit without rubbing the sloping sides of the casing or the edge of the spiral rib.

The discharge pipe may be either attached to the conical casing or the cap so as to be nearly tangent to the curved surface of the case with a gradual upward turn to give direction to the water.

The size, form, and number of the induction-openings may be varied, provided, however, there is never less than two, in order that the stream may be divided as it enters the casing.

The machine may be submerged or placed above the surface of the water. When submerged, no suction-pipe will be required. When above the water, the suction-pipe, with the valve, is necessary.

In large machines a circular groove may be made in the bottom of the casing with a corresponding groove in the lower end of the piston-rod, or in a ring attached to the blades, and between which groove spherical balls of iron or other metal are placed to diminish the friction. When the piston is put in motion, a partial vacuum is created in the casing, the water rushes through the induction-pipe, enters the casing through the induction-openings in the bottom, and a rotary motion is communicated to it by the revolving blades of the piston, which causes it to rise, following the spiral channel on the sloping sides of the casing when no projecting spiral flange is used, and is discharged nearly tangential to the periphery of the casing through the discharge-pipe.

In dividing the induction-pipe so as to form two or more openings for the passage of the fluid from the induction-pipe into the casing, I have found by repeated experiment that the divisions between the openings in a great measure prevent the piston from communicating a rotary motion to the fluid in the induction-pipe in the same direction in which it turns, which, without these divisions, it does, when the axis of the rotary piston is near the axis of the induction-pipe, and the blades of the piston pass over the opening of the induction-pipe, and which materially affects the power of the machine and its capability of raising fluids. These divisions between the openings of the induction-pipe into the casing not only in a great degree prevent this rotary motion to the fluid in the pipe in the same direction as the piston, but they intercept whatever motion the fluid may have acquired in that direction as it passes into the casing, and also causes the fluid to be presented in a divided stream to the action of the blades of the piston, so that each jet is successively acted on by the blades of the piston, whereby its inertia is more readily overcome than when the same volume enters the casing through a single opening. The blades of the piston form inclined planes, which carry the water upward and toward the periphery of the larger end of the pump with greater ease than the straight blades heretofore used.

The casing being in the form of a frustum of a cone, the sides sloping outward from the induction toward the discharge-opening of the pump, and outer edge of the blades of the piston being made to conform and run close to the sloping sides of the casing, an increased water-way is given for the fluid as it is carried toward the discharge-opening, and also increased centrifugal action produced on the fluid by the blades as the velocity of the outer edges increase with distance from the center of rotation, by which means a more rapid and free discharge is given to the fluid.

Having thus described my improvements in apparatus for raising water, what I claim therein as new, and desire to secure by Letters Patent, is—

1. The combination of a casing whose sides slope outward from the induction-opening, with a revolving-piston, the edge of whose blades conform to and run near to the sloping sides of the casing or the spiral rib, substantially as described, for the purpose set forth.

2. In combination with a casing whose sides slope outward from the induction-openings, a rotating piston with fixed blades inclined upon the face to the axis of the piston rod, for the purpose set forth.

3. Dividing the stream of liquid as it enters the casing containing the rotary piston by causing it to pass through two or more induction-openings arranged substantially as described, so that the blades of the piston pass over these openings.

In testimony whereof I have subscribed my name.

WILLIAM T. BARNES.

Witnesses:
WM. S. DAVISON,
ROBERT THOMAS.